United States Patent Office

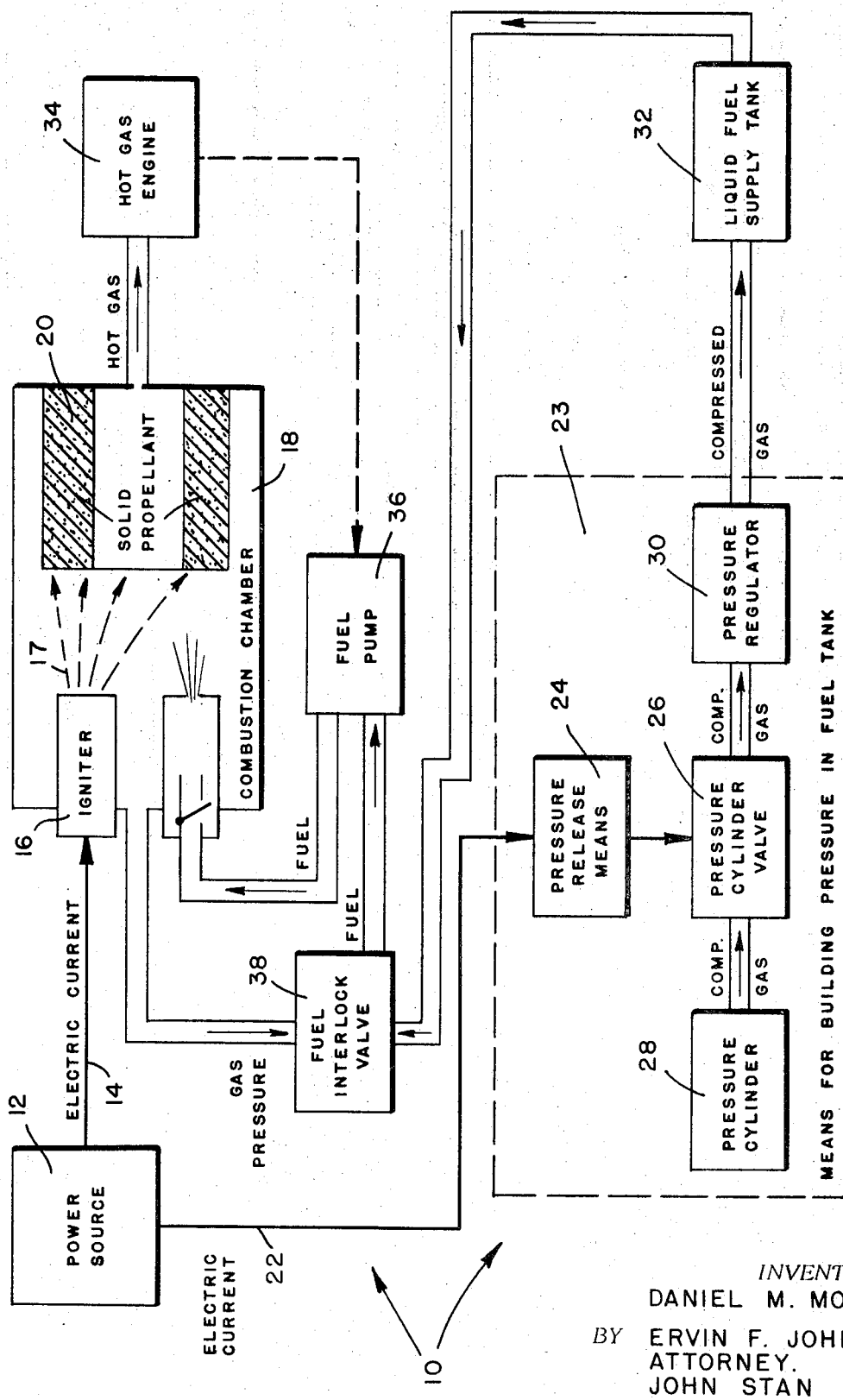

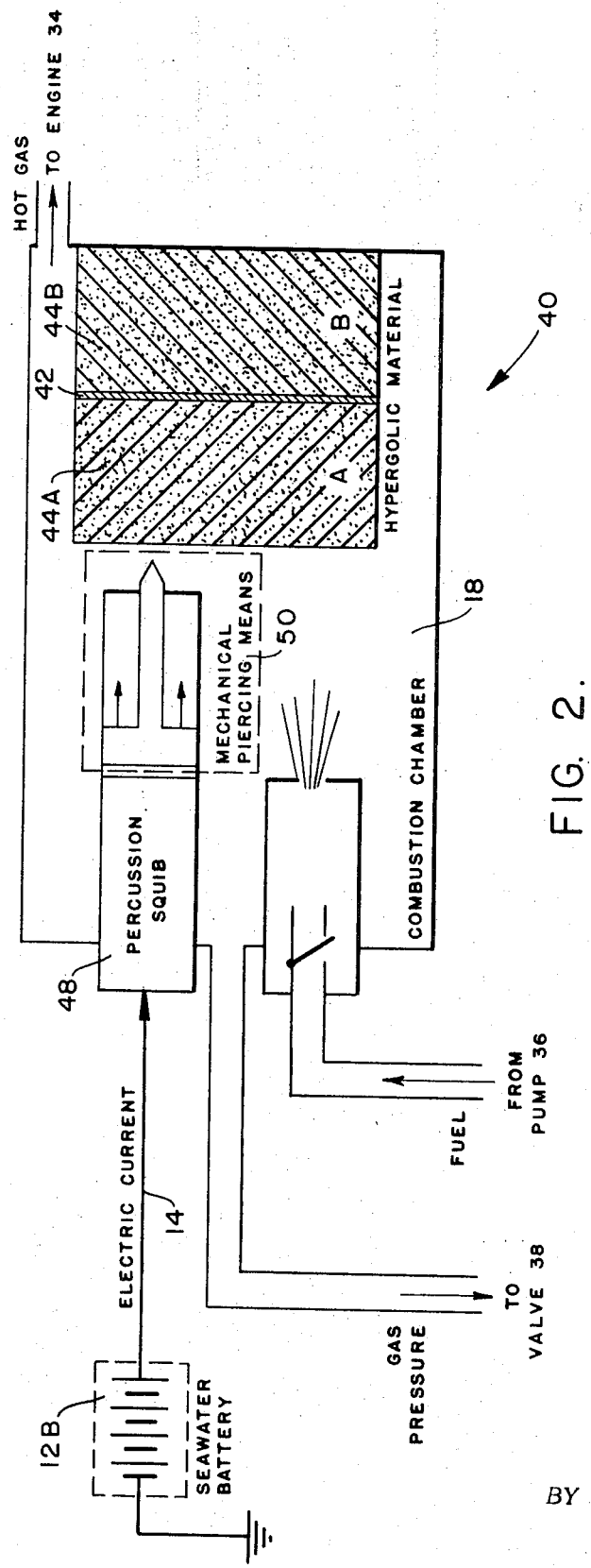

3,564,846
Patented Feb. 23, 1971

3,564,846
LIQUID-FUEL PROPULSION SYSTEM
Daniel M. Moore, Glendora, Calif., assignor to the United States of America as represented by the Secretary of the Navy
Filed Sept. 25, 1968, Ser. No. 762,461
Int. Cl. F02c *3/12;* F02g *1/00*
U.S. Cl. 60—39.48            13 Claims

ABSTRACT OF THE DISCLOSURE

A liquid-fuel propulsion system used in a torpedo for driving a hot gas engine. A charge of solid propellant is ignited in a combustion chamber and simultaneously compressed gas is released into a fuel supply tank, thereby building up pressure in the tank. The combustion of the solid propellant produces an initial quantity of hot gases which pressurize the combustion chamber and drive a hot gas engine which, in turn, drives a fuel pump. A pressure-controlled check valve communicating with the combustion chamber opens after the pressure in the chamber has built up to a required predetermined value, whereupon liquid fuel, capable of burning only when subjected to a certain minimum pressure and temperature, is caused to flow from the pressurized fuel tank, through the check valve and fuel pump and into the combustion chamber where it ignites, burns, and continues to supply communicating pressure to the pressure-controlled check valve.

---

The invention described herein may be manufactured and used by or for the Government of the United States of America for governmental purposes without the payment of any royalties thereon or therefor.

In prior art propulsion systems using a monopropellant, for example the so-called Otto fuel, pressure in the combustion chamber must be above a certain minimum threshold level for proper combustion to take place. Proper sequencing of the building up of pressure in the combustion chamber to the required value and admission of the Otto fuel into the combustion chamber was often difficult to achieve. A further serious problem involving Otto fuel injection into the combustion chamber resulted from the fact that it was safe to inject fuel only after proper ignition conditions were taking place in the combustion chamber. If combustion conditions for Otto fuel should become improper at any period after fuel injection, Otto fuel would continue to be supplied and fuel detonation or damage to the system could result.

While the liquid-fuel system of this invention is designed primarily for use with monopropellant fuel, it may be used, with modifications, as a bipropellant fuel system. In this type of system as used in the prior art, the fuel and the oxidizer coming from separate tanks were difficult and hazardous to handle. Moreover, proper proportioning of the fuel and oxidizer was a critical problem.

To overcome the aforementioned and other disadvantages of the prior art, the liquid-fuel propulsion system herein described has been invented. The general purpose of this invention is to provide a liquid-fuel propulsion system which embraces all the advantages of similarly employed prior art propulsion systems and possesses none of the aforedescribed disadvantages. To attain this, the present invention contemplates a unique arrangement of the propulsion system whereby proper initiation of ignition, successful combustion and shutting-off of the supply of fuel in the propulsion system is assured.

In brief, the system in a preferred embodiment operates as follows. Current from a power source ignites a starting charge of solid propellant in a combustion chamber and simultaneously releases compressed gas into a fuel supply tank, thereby building up pressure in the tank. The combustion of the solid propellant in the combustion chamber produces hot gases which pressurize the combustion chamber and drive a hot gas engine, for example a turbine, which, in turn, drives a fuel pump. A pressure-controlled check valve, which, because of its function, may also be called a fuel interlock valve, communicating with the combustion chamber, opens after the pressure in the chamber has built up to the required predetermined value, whereupon liquid fuel, capable of burning only when under pressure, is caused to flow from the pressurized fuel tank, through the check valve to the fuel pump and into the combustion chamber where it ignites and burns. Should the pressure in the combustion chamber drop below the value required for proper combustion of the liquid fuel, the check valve closes, preventing a further supply of liquid fuel, and thus terminating the combustion.

Accordingly, an object of the present invention is the provision of a liquid-fuel propulsion system wherein liquid fuel cannot be initially injected into a combustion chamber excepting if the required minimum pressure and temperature exist in the combustion chamber.

Another object is the provision of a liquid-fuel propulsion system wherein ignition of a propellant and pressurization of the liquid fuel are effected simultaneously, thus expediting the combustion of the liquid fuel.

Still another object of the invention is to provide a liquid-fuel propulsion system wherein fuel is applied to the combustion chamber under steady-state conditions only if the pressure and temperature existing in the combustion chamber remains above the minimum pressure and temperature required for combustion of the liquid fuel.

A further object of the invention is the provision of a liquid-fuel propulsion system which rapidly shuts itself off and seals off the fuel supply at completion of operation and also in the event of a system malfunction.

Other objects and many of the attendant advantages of this invention will be readily appreciated as the same becomes better understood by reference to the following detailed description, when considered in connection with the accompanying drawings, wherein:

FIG. 1 is a block diagram of the complete liquid-fuel propulsion system for driving a hot gas engine.

FIG. 2 is a partial block diagram of the combustion chamber of the liquid-fuel propulsion system, after modification for use with hypergolic materials.

Referring now to FIG. 1, the liquid-fuel propulsion system, the subject of this invention, may be used in a torpedo. The liquid fuel may be Otto fuel.

The liquid-fuel propulsion system 10 is started upon energization of a power source 12. In an actual embodiment used, the power supply 12 comprised a seawater battery, 12B in FIG. 2, containing a normally open switch and which contains no electrolyte until it is activated upon entry of seawater, which serves as the electrolyte, and chemically produces an electric current. Current from the power supply 12 flows through lead 14 to a means for initiating combustion, or igniter 16, and activates the igniter. The igniter 16, generally located within a combustion chamber 18, in turn, ignites a charger propellant 20, which may be a solid propellant. The igniter 16 causes the charge of solid propellant 20 to burn by sputtering particles into it, the streams of sputtered particles being designated on the drawing by numeral 17.

Simultaneously with the energization of the igniter 16, electric current flows from the power source 12 through lead 22 to a pressure release means 24, which is one component of a means 23 for building up a pressure in the fuel tank, which means is shown by a dashed line in FIG. 1. In a preferred embodiment, the pressure release means 24 comprises an electrically-fired squib, whose actuation opens a pressure-cylinder valve 26. Opening of the pressure cylinder valve 26 releases gas, which, in an exemplary embodiment, is carbon dioxide, in a container of compressed gas, or pressure cylinder 28. Firing of the squib causes a diaphragm (not shown) in the pressure cylinder valve 26 to be ruptured, thus permitting the flow of the compressed gas from pressure-cylinder 28. The compressed gas preferably flows from the pressure-cylinder valve 26 first into a pressure regulator 30 and then into a liquid-fuel tank 32, thereby pressurizing the fuel in the fuel tank.

The liquid-fuel tank 32 is an airtight, three-sectioned, chamber storing approximately 90 lbs. of fuel. It is sectioned in a manner to minimize sloshing of the liquid fuel and to maintain the center of gravity constant. During initiation of operation, the fuel is pressurized, within 2 seconds after the squib-actuated valve 26 opens, to approximately 110 p.s.i.g. Pressure in the liquid fuel tank 32 is regulated by the pressure regulator 30 and maintained at a pressure of from 90 to 140 p.s.i.g. Pressure adjustment is preset, with a relief regulator (not shown) preventing overpressurization.

Returning now to a discussion of what transpires in the combustion chamber 18, ignition of the solid charger propellant 20 generates a hot gas that pressurizes the combustion chamber 18, starts a hot-air engine 34 which, in turn, drives a fuel pump 36. When burning, the charger propellant 20 provides an initial combustion chamber pressure of 900 to 1500 p.s.i.g. for a period of approximately 5 seconds, during which time the liquid-fuel injection occurs. However, during steady-state operation, when the liquid fuel is burning, the pressure may drop considerably below this range. Nevertheless, liquid fuel will continue to be injected into the combustion chamber 18 as long as the pressure in the chamber is above a predetermined value which will cause the fuel interlock check valve 38 to close.

The liquid-fuel propulsion system 10 is so designed that the fuel pump 36 injects fuel into the combustion chamber 18 at a pressure which exceeds by approximately 50 lbs. the pressure within the combustion chamber 18.

Ignition of the charger propellant 20 also causes the temperature in the combustion chamber to rise rapidly above the minimum required temperature of approximately 300° F. for successful burning of the Otto fuel.

The Otto fuel used as the liquid fuel is in itself both an oxidizer and a fuel. A characteristic of Otto fuel requires that the temperature and pressure in the combustion chamber 18 must reach a predetermined minimum temperature and injection pressure before the Otto fuel can be safely introduced for burning.

The building up of pressure and temperature in the combustion chamber 18 by the burning of the charger propellant 20 opens up a pressure-sensitive fuel interlock check valve 38, which permits the injection of liquid fuel from the liquid-fuel tank 32, through the fuel interlock valve 38, through the fuel pump 36 and into the hot propellant gases in the combusion chamber 18, where it ignites and burns. A bypass valve (not shown) in the fuel pump 36 controls the amount of fuel flow through the fuel interlock valve 38 to the combustion chamber 18. Fuel flow varies with torpedo depth in order to maintain essentially constant engine speed. Pressurization of the liquid fuel in the fuel tank 32 insures adequate priming of the fuel pump 36 after the fuel interlock valve 38 opens.

The charger propellant 20 is so chosen that, upon combustion, it is capable of producing hot gases which drive the hot gas engine 34, pressurize and increase the temperature in the combustion chamber 18 to the predetermined minimum pressure and temperature for safe injection of Otto fuel into the combustion chamber. The subsequent burning of the Otto fuel maintains a pressure in the combustion chamber, which in turn holds the fuel interlock valve 38 open. A very important feature of the liquid fuel propulsion system 10 herein described is that it insures that the Otto fuel does not reach the fuel pump 36 until the pressure in the combustion chamber 18 has reached a safe minimum injection pressure and the temperature is favorable for combustion of the liquid fuel.

The fuel interlock valve 38 is fully described in my U.S. patent application, Ser. No. 749,098, entitled "Interlocking Sequence Valve for Liquid Fuel," filed on July 31, 1968. Essentially, it opens and remains open only so long as pressure at one of its ports, a control port, exceeds a predetermined minimum value. A metallic diaphragm in the fuel interlock valve 38 prevents fuel from entering the interlock valve and a spring-loaded piston prevents fuel from flowing through the interlock valve into the fuel pump 36 until the diaphragm is ruptured by a knife attached to the end of the spring-loaded piston in the interlock valve 38. This rupturing occurs when the initial pressure impulse generated by the burning of the charger propellant 20 within the combustion chamber reaches approximately 300 p.s.i.g., at which time the piston-driven knife ruptures the diaphragm. Fuel then flows from the fuel tank 32, through the fuel interlock valve 38 to the fuel pump 36. As liquid fuel is pumped into the combustion chamber 18 and ignited by the burning propellant 20, the rate of gas generation increases. With this increase of generation, the system builds up to the steady-state, engine-operating condition.

After fuel flow through the interlock valve 38 has been established, pressure developed in the combustion chamber 18 by the burning of the liquid fuel keeps the fuel of fuel to the fuel pump. When the liquid fuel is expended interlock valve 38 open and allows a continuous supply or the pressure in the combustion chamber 18 decreases below a certain predetermined value required for proper combustion of the liquid fuel, the combination of pressurized fuel flow and spring force acts upon the piston in the fuel interlock valve 38, returning the piston to its closed position, thereby resealing the fuel tank 32, shutting off the flow of liquid fuel and shutting down the hot gas engine 34.

Other components in addition to those described heretofore may be used.

For example, the battery used as a power source could have an electrolyte other than seawater. In fact, dry cells have been successfully used for this purpose.

The charger propellant need not be a solid propellant. As shown in the embodiment 40 of FIG. 2, it could consist of two materials having a hypergolic relationship whose components 44A and 44B are separated by a partition 42. Firing of a percussion squib 48 for piercing of the partition 42 by mechanical means 50 may be made to destroy at least part of the partition, causing the components 44A and 44B of the hypergolic material to come together and burn. With hypergolic material, of course, an igniter of the type described above is not needed.

With a duplication of some of the basic components of the liquid-fuel propulsion system heretofore described, the propulsion system may even be adapted for used as a bipropellant propulsion system.

This means for building up a pressure in the liquid fuel tank 32 could take on a completely different form. For example, a diaphragm on side of which is accessible to seawater pressure may be used to push liquid fuel into the liquid fuel tank 32.

Another manner in which pressure can be developed in the liquid fuel tank 32 is by feeding some of the pressure developed in the combustion chamber 18 back into the liquid fuel tank 32 to force the fuel into the fuel interlock valve 38.

As in the prior art, the pressure release means 24 could be a solenoid which upon energization opens a pressure cylinder valve 26.

In another embodiment of the liquid fuel propulsion system 10, the pressure regulator 30 was not used, but instead, a controlling orifice was used to control pressure-volume flow. The pressure release means consisted of a plug stoppering the orifice until operation of the liquid fuel propulsion were initiated, whereupon the plug would be removed from the orifice by electrical or mechanical means. When a controlling orifice is used, the gas within the pressure cylinder 28 may be Freon, inasmuch as carbon dioxide tends to solidify at the orifice.

Instead of a fuel pump 36, a differential pressure valve or piston assembly may be used.

Obviously many modifications and variations of the present invention, in addition to those already itemized, are possible in the light of the above teachings. It is therefore to be understood that within the scope of the appended claims, the invention may be practiced otherwise than as specifically described.

What is claimed is:

1. In a liquid-fuel propulsion system:
   a combustion chamber containing a charger propellant within it, which, upon combusting, develops a pressure and temperature in the combustion chamber to a magnitude above a threshold value required to initiate combustion of a liquid fuel introduced into the combustion chamber;
   a pressure-controlled check valve, communicating with the combustion chamber and responsive to the charger propellant pressure developed therein so as to open when the pressure reaches a predetermined value for controlling the flow of liquid fuel into the combustion chamber;
   a liquid-fuel tank operably connected to the check valve for feeding liquid fuel to the combustion chamber;
   a means for initiating combustion of the charger propellant, the means being operably connected to the combustion chamber;
   a means for building up a pressure in the fuel tank operably connected to the fuel tank;
   a power source connected to the means for initiating combustion and the means for building up fuel tank pressure for simultaneously energizing the means for initiating combustion and the means for building up the pressure in the fuel tank;
   an engine operatively connected to the combustion chamber so as to be driven by hot gas formed by the combustion of the charger propellant and the liquid fuel in the combustion chamber;
   a fuel pump operatively connected to and driven by the hot-gas engine and communicating with the pressure-controlled check valve and the combustion chamber; and
   the pressure of said means for building up a pressure in the fuel tank being sufficient to prime said fuel pump.

2. A propulsion system as recited in claim 1 wherein the charger propellant is a solid monopropellant.

3. A propulsion system as recited in claim 1 wherein the charger propellant consists of two materials having a hypergolic relationship.

4. A propulsion system as recited in claim 1 wherein the means for building up a pressure in the fuel tank comprises:
   a pressure release means energized by electrical energy from the power source;
   a pressure cylinder valve actuated by the pressure release means;
   a pressure cylinder containing a supply of compressed gas, the flow of which is controlled by the pressure cylinder valve; and
   a pressure regulator communicating with the pressure cylinder valve and the liquid fuel tank for regulating the pressure of the compressed gas flowing into the liquid fuel tank and pressurizing the liquid fuel.

5. A propulsion system as recited in claim 1 wherein the means for building up a pressure comprises:
   a pressure release means actuated by electrical energy from the power source;
   a pressure cylinder containing a supply of compressed gas; and
   a controlling orifice opened by the pressure release means and communicating between the pressure cylinder and the liquid fuel tank.

6. A propulsion system as recited in claim 5 wherein the compressed gas is carbon dioxide.

7. A propulsion system as recited in claim 1 wherein the power source is a seawater battery.

8. In a liquid-fuel propulsion system:
   a combustion chamber containing a charger propellant which, upon combusting, develops a pressure and temperature in the combustion chamber to a magnitude above a threshold value required to initiate combustion of a liquid fuel introduced into the combustion chamber;
   the charger propellant comprising two materials which have a hypergolic relationship;
   a pressure-controlled check valve, communicating with the combustion chamber and responsive to the charger propellant pressure developed therein so as to open when the pressure reaches a predetermined value for controlling the flow of liquid fuel into the combustion chamber;
   a liquid-fuel tank operably connected to the check valve for feeding liquid fuel to the combustion chamber;
   a means for initiating combustion of the charger propellant, the means being operably connected to the combustion chamber;
   a means for building up a pressure in the fuel tank operably connected to the fuel tank; and
   a power source connected to the means for initiating combustion and the means for building up fuel tank pressure for simultaneously energizing the means for initiating combustion and the means for building up the pressure in the fuel tank.

9. A propulsion system as recited in claim 8 further comprising:
   an engine operatively connected to the combustion chamber so as to be driven by hot gas formed by the combustion of the charger propellant and the liquid fuel in the combustion chamber.

10. A propulsion system as recited in claim 8, wherein the means for building up a pressure in the fuel tank comprises:
   a pressure release means energized by electrical energy from the power source;
   a pressure cylinder valve actuated by the pressure release means;
   a pressure cylinder containing a supply of compressed gas, the flow of which is controlled by the pressure cylinder valve; and
   a pressure regulator communicating with the pressure cylinder valve and the liquid fuel tank for regulating the pressure of the compressed gas flowing into the liquid fuel tank and pressurizing the liquid fuel.

11. A propulsion system as recited in claim 8, wherein the means for building up a pressure comprises:
   a pressure release means actuated by electrical energy from the power source;
   a pressure cylinder containing a supply of compressed gas; and
   a controlling orifice opened by the pressure release means and communicating between the pressure cylinder and the liquid fuel tank.

12. A propulsion system as recited in claim 11 wherein the compressed gas is carbon dioxide.

13. A propulsion system as recited in claim 8 wherein the power source is a seawater battery.

References Cited

UNITED STATES PATENTS

| | | | |
|---|---|---|---|
| 2,977,755 | 4/1961 | Geckler | 60—39.46 |
| 2,733,569 | 2/1956 | Trowbridge | 60—39.14 |
| 2,858,672 | 11/1958 | Clark | 60—39.48 |
| 2,926,492 | 3/1960 | Flanagan | 60—39.48 |
| 2,934,897 | 5/1960 | Waugh | 60—39.48 |
| 3,095,705 | 7/1963 | Tabberer | 60—39.48 |

FOREIGN PATENTS

| | | | |
|---|---|---|---|
| 861,735 | 2/1961 | Great Britain | 60—39.48 |

DOUGLAS HART, Primary Examiner